United States Patent
Green et al.

(10) Patent No.: US 7,324,588 B2
(45) Date of Patent: Jan. 29, 2008

(54) APPARATUS, AND ASSOCIATED METHOD, FOR TESTING A MOBILE TERMINAL IN TEST CONDITIONS THAT EMULATE AN OPERATING ENVIRONMENT

(75) Inventors: Marilynn Green, Pomona, NY (US); Shu-Shaw Wang, Arlington, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/562,841

(22) PCT Filed: Jun. 30, 2004

(86) PCT No.: PCT/US2004/021262

§ 371 (c)(1),
(2), (4) Date: Jul. 13, 2006

(87) PCT Pub. No.: WO2005/006010

PCT Pub. Date: Jan. 20, 2005

(65) Prior Publication Data

US 2007/0019769 A1    Jan. 25, 2007

Related U.S. Application Data

(60) Provisional application No. 60/483,663, filed on Jun. 30, 2003.

(51) Int. Cl.
*H04B 3/46* (2006.01)
*H04B 17/00* (2006.01)
*H04Q 1/20* (2006.01)

(52) U.S. Cl. .................. 375/224; 455/425; 455/67.11

(58) Field of Classification Search ........ 455/423–425, 455/67.11, 115.1, 115.2; 379/1.01, 21; 370/241; 375/224
See application file for complete search history.

(56) References Cited

U.S. PATENT DOCUMENTS

| | | | | |
|---|---|---|---|---|
| 5,134,643 A | * | 7/1992 | Iwata | 455/423 |
| 5,410,753 A | * | 4/1995 | Szabo | 455/67.14 |
| 5,471,649 A | * | 11/1995 | Rees et al. | 455/67.14 |
| 5,504,800 A | * | 4/1996 | Yehushua et al. | 379/27.01 |
| 5,654,901 A | * | 8/1997 | Boman | 717/173 |
| 5,715,433 A | * | 2/1998 | Raghavan et al. | 703/21 |
| 5,717,903 A | | 2/1998 | Bonola | |
| 5,794,128 A | * | 8/1998 | Brockel et al. | 455/67.11 |
| 5,831,996 A | | 11/1998 | Abramovici et al. | |
| 5,924,029 A | * | 7/1999 | Sohngen et al. | 455/423 |
| 5,953,516 A | | 9/1999 | Bonola | |
| 6,123,735 A | * | 9/2000 | Raghavan et al. | 703/21 |
| 6,125,107 A | * | 9/2000 | Johnson et al. | 370/241 |
| 6,128,474 A | * | 10/2000 | Kim et al. | 455/67.11 |
| 6,308,065 B1 | * | 10/2001 | Molinari et al. | 455/424 |
| 6,587,671 B1 | * | 7/2003 | Kanago et al. | 455/67.11 |
| 6,697,604 B1 | * | 2/2004 | Rimpela et al. | 455/67.14 |
| 6,771,957 B2 | * | 8/2004 | Chitrapu | 455/423 |
| 6,898,746 B2 | * | 5/2005 | Jain et al. | 714/724 |
| 7,076,246 B2 | * | 7/2006 | Chitrapu | 455/425 |
| 7,127,649 B2 | * | 10/2006 | Leaming | 714/715 |

(Continued)

*Primary Examiner*—Jean B. Corrielus
(74) *Attorney, Agent, or Firm*—Alston & Bird LLP

(57) ABSTRACT

Testing apparatus, and an associated method, for testing operation of a mobile terminal. Testing is performed, e.g., to determine compliance of the mobile terminal to E911 Phase II positioning requirements. A network and radio channel emulator emulates network signals generated and communicated to the mobile terminal in an actual operating environment. Positioning measurements made by the mobile terminal are monitored and determinations of the operation of the mobile terminal are made therefrom.

20 Claims, 6 Drawing Sheets

U.S. PATENT DOCUMENTS

2002/0015387 A1  2/2002  Houh
2002/0016708 A1  2/2002  Houh
2002/0016937 A1  2/2002  Houh
2002/0169591 A1* 11/2002  Ryzl ............................ 703/24

* cited by examiner

FIGURE 8

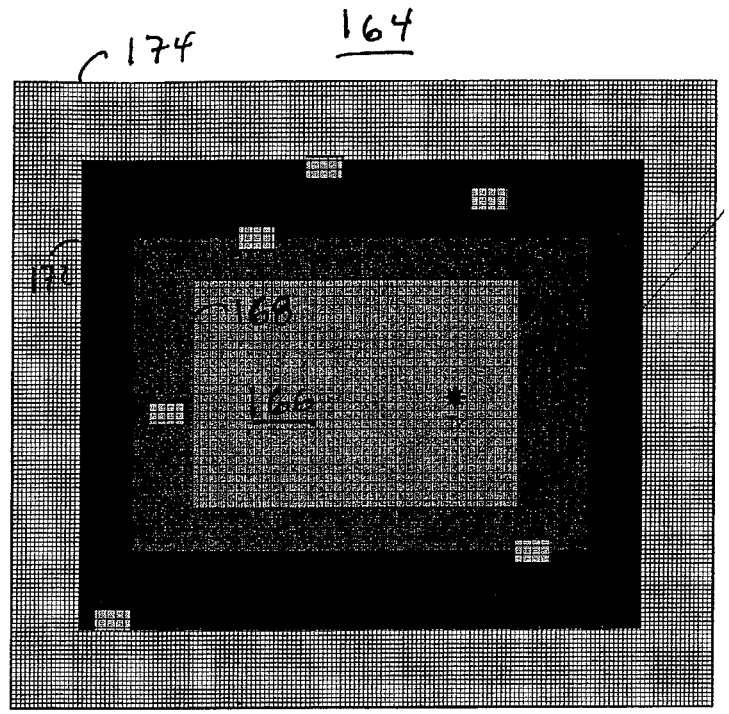

| | BS#1 | BS#2 | BS#3 | BS#4 |
|---|---|---|---|---|
| Rxr Loc. #1 | Parameter Set $A_{11}, B_{11}, C_{11}, D_{11}$ | Parameter Set $A_{12}, B_{12}, C_{12}, D_{12}$ | Parameter Set $A_{13}, B_{13}, C_{13}, D_{13}$ | Parameter Set $A_{14}, B_{14}, C_{14}, D_{14}$ |
| Rxr Loc. #2 | Parameter Set $A_{21}, B_{21}, C_{21}, D_{21}$ | Parameter Set $A_{22}, B_{22}, C_{22}, D_{22}$ | Parameter Set $A_{23}, B_{23}, C_{23}, D_{23}$ | Parameter Set $A_{14}, B_{14}, C_{14}, D_{14}$ |
| Rxr Loc. #3 | Parameter Set $A_{31}, B_{31}, C_{31}, D_{31}$ | Parameter Set $A_{32}, B_{32}, C_{32}, D_{32}$ | Parameter Set $A_{33}, B_{33}, C_{33}, D_{33}$ | Parameter Set $A_{34}, B_{34}, C_{34}, D_{34}$ |
| ... | ... | ... | ... | ... |
| Rxr Loc. #N | Parameter Set $A_{N1}, B_{N1}, C_{N1}, D_{N1}$ | Parameter Set $A_{N2}, B_{N2}, C_{N2}, D_{N2}$ | Parameter Set $A_{N3}, B_{N3}, C_{N3}, D_{N3}$ | Parameter Set $A_{N4}, B_{N4}, C_{N4}, D_{N4}$ |

$A_{ij}$: Time delays
$B_{ij}$: Nakagami-m fading parameter
$C_{ij}$: Angles of arrival
$D_{ij}$: Power

FIGURE 9

APPARATUS, AND ASSOCIATED METHOD, FOR TESTING A MOBILE TERMINAL IN TEST CONDITIONS THAT EMULATE AN OPERATING ENVIRONMENT

CROSS REFERENCE TO RELATED APPLICATIONS

The present application is a national phase entry of International Application No. PCT/US2004/021262 filed Jun. 30, 2004 and which claims priority from U.S. Provisional Application No. 60/483,663 filed Jun. 30, 2003.

FIELD OF THE INVENTION

The present invention relates generally to a manner by which to test operation of a mobile terminal under test conditions that mimic an operating environment in which the mobile terminal is operable. More particularly, the present invention relates to apparatus, and an associated method, that tests the mobile terminal to determine its operational capabilities, such as to determine capability of the mobile terminal accurately to make advance forward link trilateration (AFLT) measurements.

Emulated signals are applied to the mobile terminal and responses representative of the measurements made at the mobile terminal are detected. The emulated signals are emulative of, e.g., a cellular network that generates pilot signals that are broadcast upon radio channels of specific characteristics. Improved emulation of the network and of the radio channel provide for more accurate testing of the mobile terminal.

BACKGROUND OF THE INVENTION

Without limiting the scope of the invention, its background is described in connection with emulator test systems used to model signal response over communication channels.

Advanced forward link trilateration (AFLT) is a handset-based geolocation technology that has been standardized for the emergency location of CDMA terminals by the Telecommunications Industry Association's TR-45.5 in IS-801. In order to provide the appropriate measurements for AFLT-based positioning, the mobile device must measure the time differences between CDMA pilot signals, where the term CDMA pilot signals specifically refers to the serving cell pilot signal and neighboring cell pilot signals. The observations from two such neighboring cells along with the serving base station' coordinates are minimally sufficient to determine the location of the mobile device (although, in practice, more pilot signals may be captured in order to reduce the final location error). In the AFLT implementation, the terminal uses IS-801 standardized messaging to convey the measurement data to the PDE (Position Determination Element) by way of the CDMA network. Finally, at the PDE, the measured time (phase) differences can be converted to range differences that can be used to formulate a simultaneous system of nonlinear equations. In the absence of any measurement or systematic error, the intersection of these equations unambiguously defines the handset's location.

The FCC has defined a set of accuracy requirements for E-911 calls, which are collectively known in the industry as the E-911 Phase II mandate. The mandate states that handset-based solutions should locate the E-911 caller to within 50 meters for 67% of the calls and to within 150 meters for 95% of the calls. The new ALI (Automatic Location Identification)-capable handsets must fulfill the FCC's E911 Phase II location accuracy requirement by October 2003.

FCC OET Bulletin No. 71 defines a statistical approach for demonstrating compliance for empirical testing. If n denotes the number of measurements, the $r^{th}$ and $s^{th}$ measurements are denoted as $x_r$ and $y_s$, respectively. x and y are the percentile points associated with probabilities $p_1$ and $p_2$ respectively, then the probability that x is less than $x_r$ while simultaneously y is less than $y_s$ is given by the formula:

$$\text{confidence}\begin{pmatrix} x \le x_r, y \le y_s; \\ n, r, s, p_1, p_2 \end{pmatrix} = \sum_{i=1}^{r-1} \sum_{j=1}^{s-1} \binom{n}{i}\binom{n-i}{n-j} p_1^i (p_2 - p_1)^{j-i}(1 - p_2)^{n-j}$$

$p_1=0.67$ and $p_2=0.95$. This formula is used in order to verify compliance.

This mandate has a tremendous impact on the carriers as well as the vendors, so it is rather important to establish reproducible and non-discriminatory test scenarios, testing methods and procedures in order to verify that the mobile phones fulfill these and possibly other accuracy requirements. As is the case with mobile phone compliance and verification testing, the carriers/vendors also need a standardized test environment in which location system calibration and verification can be performed. Therefore, a standardized laboratory test system, which can be used in lieu of extensive field-testing, can be used as a basis to verify the location accuracy for different brands of the phones in different (emulated) environments—and this type of system is currently in great demand. In addition, laboratory testing may also reduce the number and cost of field trials.

Prior to widescale deployment of AFLT, handset manufacturers and infrastructure vendors require a standardized, well-defined and repeatable method for testing system-integrated performance in a real-time re-configurable test system. This intermediate stage of testing may, in fact, circumvent the need to schedule field tests at all but a nominal number of live test sites prior to implementation. At least two of the major test equipment vendors have already developed E911 Phase II compliance verification system that could be used for testing the A-FLT location technology. The current approach is to use state-of-the-art CDMA network emulation hardware with programmable impairments in order to model some of the real-world cellular network phenomena that degrade system performance. They also use purely stochastic radio channel modeling that is either based on channel models that are obtained directly from the literature or from those published by the standards bodies for the compliance testing of mobile devices. While these models may capture some of the important aspects of the radio channel for different multipath environment (such as urban, rural and suburban), they cannot closely model the channel impulse response that will be encountered in a particular location. Thus, although a rural channel model may give some indication of the average channel properties for an area that falls into this classification, one might find that the actual deviations of the true radio channel from the stochastic channel model in a particular rural area might indeed be significant. Hence, it is readily apparent that the E911 Phase II compliance and verification systems that have been designed are not customized to predict the location accuracy for specific geographical areas.

Next generation of hardware-in-the-loop test apparatus and systems should provide a mechanism for emulating, with as much detail as is feasible, some of the market-specific conditions that will differentiate the performance in one network/environment/locale versus another. As systems evolve towards use of smaller cell sizes and increasingly there is need to deploy smarter networks, there is an accompanying need to provide a more realistic model of impact of the landscape/terrain/manmade features on the characteristics of the received radio signal. This requires the use of more sophisticated channel prediction techniques that are capable of providing market-specific channel data that is a better representation of the channel measurements that would actually be obtained during extensive field-testing.

As may be seen, an improved emulating system for determining positional coordinates for a selected geographic area model could provide significant advantages over existing systems.

What is needed, therefore, is an improved manner by which to test a mobile terminal for its compliance in E-911 Phase II accuracy requirements.

It is in light of this background information related to testing of operation of mobile terminals that the significant improvements of the present invention have evolved.

SUMMARY OF THE INVENTION

The present invention, accordingly, advantageously provides apparatus, and an associated method, by which to test operation of a mobile terminal under test conditions that mimic an operating environment in which the mobile terminal is operable.

Through operation of an embodiment of the present invention, a manner is provided by which to test the mobile terminal to determine its operational capabilities, such as to determine capability of the mobile terminal accurately to make advance forward link trilateration measurements.

The test apparatus includes an emulator that emulates an actual operating environment in which the mobile terminal is positionable. The emulator generates emulated signals that are applied to the mobile terminal when the mobile terminal undergoes testing, i.e., forms a terminal under test. Responsive thereto, the mobile terminal makes measurements, such as the AFLT measurements, and forms responses representative of the measurements. The test apparatus detects the responses and determines the operational conformity of the mobile terminal therefrom.

The emulated signals are emulative of, e.g., a cellular network that generates pilot signals that are broadcast upon radio channels of specific characteristics. Improved emulation of the network and of the radio channel provide for more accurate testing of the mobile terminal.

In one aspect of the present invention, an improved emulating system is provided for determining positional coordinates for a mobile device within a selected geographic area.

In another aspect of the present invention, an AFLT geolocation hardware-in-the-loop test system is provided that is used to verify E-911 Phase II compliance of CDMA mobile devices and networks. The system is designed in order to meet the criterion set forth by the FCC for the testing of such systems. Unlike other commercial laboratory test systems, this test system is capable of testing real world performance in specific geographical areas by the use of area-specific semi-deterministic channel modeling. This invention uses a ray-tracing tool that operates on the 3D building data base information that models a specific geographical area in order to provide a robust prediction of the long-term channel characteristics. The short-term channel characteristics (such as short-term fading) are modeled using a well-known stochastic channel model (CoDiT). The channel model module is integrated into a standard hardware-in-the-loop test environment (described in more detail below) as a vehicle to support the real-time testing of CDMA mobile devices and networks in realistic test environments. The outcome is a testing system that meets the FCC's requirements for such predictive methods and which produces output that is meaningful to public safety personnel and others who are responsible for wireless system performance. This type of approach is only second in predictive accuracy to actual field-testing, and it is a unique method of system design for this application. Furthermore, there is no other commercial vendor who has designed a system that is capable of testing for E911 Phase II compliance (for any of the FCC-approved emergency location technologies) in specific geographical locations.

In these and other aspects, therefore, apparatus, and an associated method, is provided for testing a terminal under test. The testing is pursuant to a control environment that is emulative of an operating environment. An operating environment emulator generated emulates signals for application to the terminal under test. The emulated signals are emulative of signals generated and communicated in the operating environment. Emulation of the operating environment utilizes a modeled radio channel. The modeled radio channel is modeled using a channel impulse response estimate formed of a combination of at least a first non-diffuse component and at least a diffuse component. An analyzer is adapted to receive indications of responses made by the terminal under test in response to the application to the terminal under test of the emulated signals generated by the operating environment emulator.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 8 illustrates a graphical representation, of a multi-path mask generated as a result of ray tracing prediction pursuant to operation of an embodiment of the present invention.

FIG. 9 illustrates a representation of a parameter look-up table forming part of the testing apparatus shown in FIG. 7.

DETAILED DESCRIPTION

Figure 1:
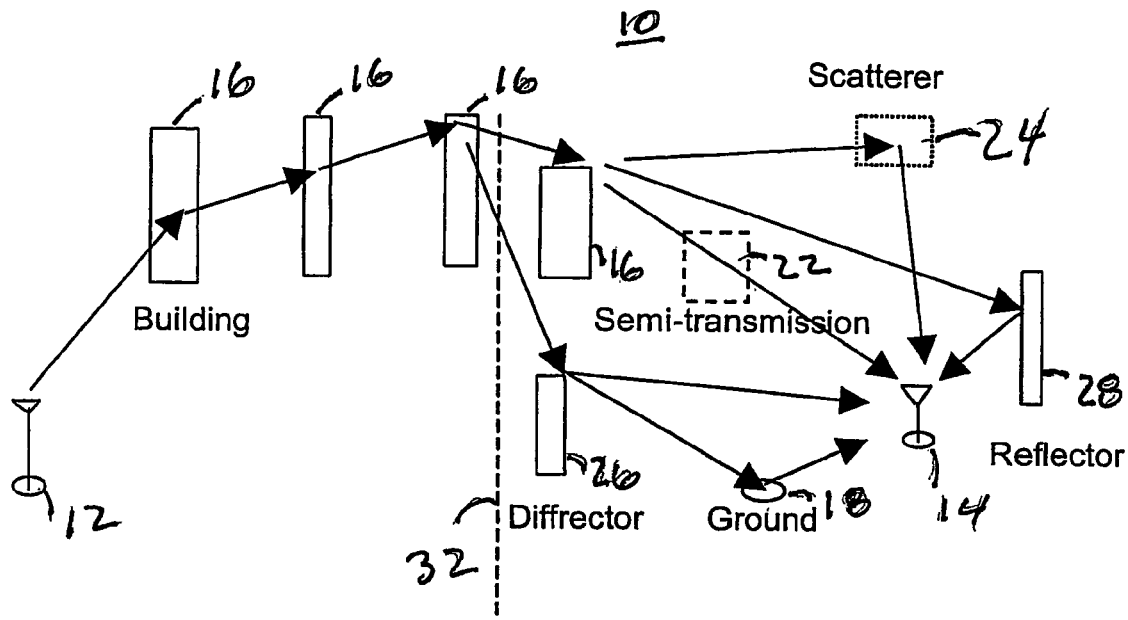
FIG. 1 illustrates a representation of an urban propagation environment in which a radio channel is definable and a model of which is formable by the radio channel emulator of an embodiment of the present invention.

While the use and implementation of particular embodiments of the present invention are presented in detail below, it will be understood that the present invention provides many inventive concepts which can be embodied in a wide variety of contexts. The specific embodiments discussed herein are mere illustrations of specific ways for making and using the invention and are not intended to limit the scope of the invention.

One method for generating site-specific channel models is through the use of ray tracing, by which one can simulate the behavior of RF energy as it propagates through models of buildings and as it interacts with the models of the obstacles that exist in the real environment. The final outcome is a site-specific prediction of path loss, long-term fading, propagation delay, and the effects of the NLOS (Non-Line-Of-Sight) situation.

For outdoor channel modeling, a typical ray-tracing simulator will use 3D building database data for a particular location in order to predict certain features of the radio channel, such as the signal strength for cell planning. Although ray-tracing results in a more realistic radio channel model than does the use of an 'off the shelf' empirically based stochastic model, it is important to note that only a limited level of detail is imported into the simulation environment. Hence, building wall may be modeled as a panel without windows, light posts, which commonly act as scatterers, may not be included in the building database information, and vegetation cannot be exactly modeled. The omission of these, and other, details from the radio environment imply that the ray-traced channel model will primarily capture the phenomena of line of sight propagation, specular reflection, and corner diffraction, since the level of detail and the simulation time that would be required to completely model the effect of scattering on the radio signal would be prohibitive. The detailed ray-tracing sensitivity analyses related to simulation time and predicted signal error are listed in.

Since ray-tracing does not generally calculate the diffused rays, we propose a new methodology for channel prediction whereby ray tracing is used in order to predict the specular components of the multipath impulse response and then a stochastic model based on CoDiT (Code Division Testbed) is used in order to create the random phases and angles of arrival of the diffused rays. These diffused rays will contribute to the short-term fading and the Doppler shift in the channel model. This approach serves to elevate the ray-traced channel model to an even more realistic representation of the energy propagation in each specific area In the exposition to follow, a manner is provided by which to build the geo-location channel model, which combines both ray tracing and the stochastic models from CoDiT.

Geo-Location Channel Modeling Algorithm:

A channel prediction tool is provided that is based on the combined use of ray-tracing and stochastic modeling. The objective is to design a site-specific radio channel emulator that can closely represent the propagation channel experienced by the mobile terminal as a function of location. In order to achieve this criterion, the emulator design has to carefully consider several important propagation factors—such as path loss, long-term fading, the NLOS situation, short-term multipath fading and Doppler shift.

FIG. 1 provides a general idea about the regions that contribute to long-term fading and short-term fading, and how ray tracing calculates the specular reflections. FIG. 1 illustrates an urban area at which a set of communication stations, communication stations 12 and 14, are positioned. The communication station 12 forms a sending station, and the communication station 14 forms a receiving station. The sending station 12 here is representative of a base station of a cellular communication system, and the communication station 14 is representative of a mobile station of the cellular communication station.

The urban area includes a plurality of building structures 16. The building structures alter communication of signals between the sending and receiving stations forming the base station and mobile station. Ground areas, represented by the ground 18, areas of semi-transmission characteristics, represented by the area 22, objects that cause scattering, indicated by the area 24, objects that cause diffraction, indicated by the diffractor 26, and objects that cause reflections, indicated by the reflector 28, also form parts of the urban environment. These elements also affect transmission of signals between the communication stations 12 and 14. In the exemplary environment shown in FIG. 1, the portion of the area positioned at the left (as shown) of the line 32 defines a long-term fading region. And, the area to the right (as shown) of the line 32 defines a short-term fading region.

Figure 2:
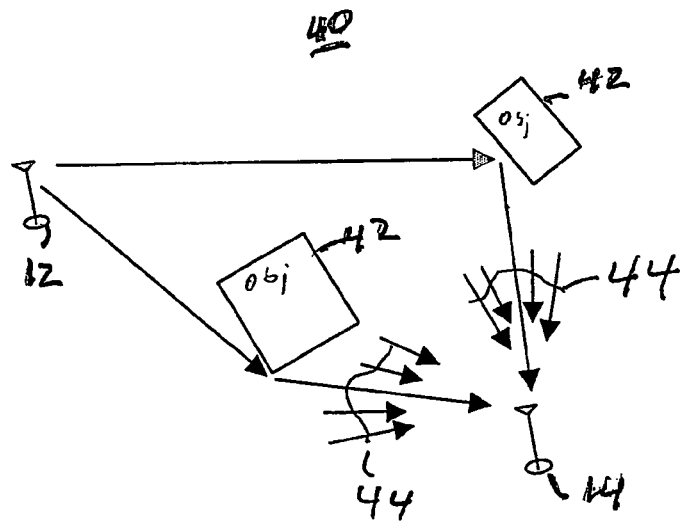
FIG. 2 illustrates a representation of short-term fading due to multi-path transmission, modeling of which is formable by the radio channel emulator of an embodiment of the present invention.

FIG. 2 illustrates another exemplary area, here shown generally at 40, also in which sending and receiving stations 12 and 14 are positioned. Here, objects 42 affects the communication of signals between the communication stations. Diffusers 44 also form part of the area 40 and cause diffusion of signals passing therethrough.

Figure 3:
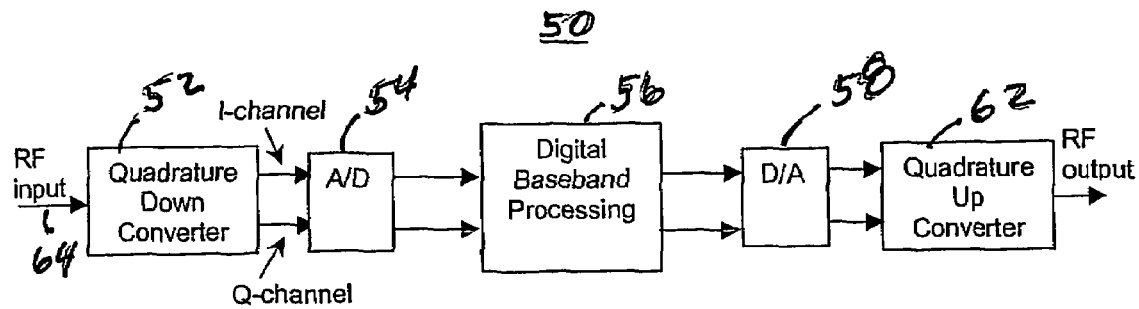
FIG. 3 illustrates a functional block diagram of a radio channel emulator of an embodiment of the present invention.

FIG. 3 illustrates a radio channel emulator, shown generally at 50, of an embodiment of the present invention. The emulator is used, in the exemplary implementation, pursuant to E-911 Phase II test environment procedures. The hardware-in-the-loop-E-911 phase II test environment is either a conducted environment or a radiated environment. Exemplary operation with respect to a radiated environment is described herein. Operation with respect to a conducted environment is analogous.

The emulator includes a quadrature down converter 52, an analog-to-digital (A/D) converter 54, a digital base band processing element 56, a digital-to-analog (D/A) converter 58, and a quadrature up converter 62.

The RF input from the transmitting antenna on the line 64 is first down converted to an IF (Intermediate Frequency) by the down converter 52 and then the system samples the incoming signal to perform an analog to digital (A/D) conversion by the converter 54. The outcome is the generation of an I-channel (in-phase component) and Q-channel (quadrature component). The Digital Baseband Processing element 56 is used to design and model the geo-location radio channel. Once the incoming IF is sampled and mixed with the specified I- and Q-channel impulse responses, then a digital to analog (D/A) conversion by the converter 58 will return the IF samples back to an IF analog signal. Finally, the IF analog signal is up converted to an RF signal output by the up converter. When the mobile receives this RF signal output from geo-location channel emulator, this RF signal generated from the emulator will be fairly representative of the RF signal that would be received during a field test.

Figure 4:
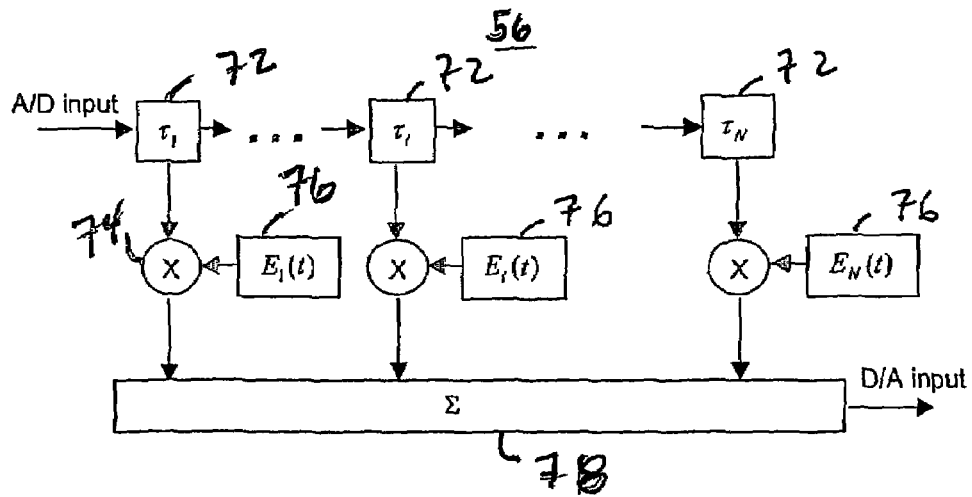
FIG. 4 illustrates a functional block diagram of a tap delay line model that forms part of the radio channel emulator shown in FIG. 3.

A tapped delay line, as represented in FIG. 4, can be used to implement the Digital Baseband Processing block. The tapped delay line includes a plurality of delay elements 72 of which taps taken therefrom are mixed by mixers 74 with values 76. And, once mixed, the multiplied values are summed by a summer 78 for subsequent application to the D/A converter 58 (shown in FIG. 3). The $i^{th}$ path delay bin of the multipath profile is represented as $\tau_i$. Multiple rays that arrive within the same bin are vector-summed (since they are expressed using complex components) and represented as $E_i(t)$ where i=1, 2, ..., N (e.g., N=10).

Figure 5:
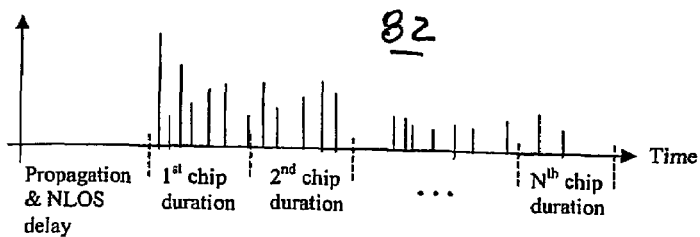
FIG. 5 illustrates an exemplary power delay profile formed by ray-tracing modeling, formed pursuant to operation of an embodiment of the present invention.

A typical example of the received power delay profile, shown generally at 82, generated from a ray-tracing simulation is shown in FIG. 5. In order to reduce the computation time, one must typically select the maximum allowed number of ray bounces (i.e., diffractions and reflections) to prune the ray-tracing tree-nodes complexity. Any ray that bounces more than the maximum allowed number is not considered further, since its received power level will be lower than a pre-specified threshold. In the exemplary implementation, a ray path is cut off after two reflections and three diffractions.

The channel impulse response based on this complex FIR filter implementation will be $$h(t, \tau) = \sum_{i=1}^{N} E_i(t) \cdot \delta(\tau - \tau_i) \quad (1)$$

and $$E_i(t) = \sum_{p=1}^{L} E_{i,p}(t) \quad (2)$$

where L is the number of ray-tracing rays fall into any one delay bin. $E_{i,p}(t)$ is the complex field at time t, which is a combination of any one ray obtained from ray-tracing simulation and its associated diffusion rays, as shown in FIG. 2. This complex field including path loss, long-term fading, NLOS situation, short-term fading, and Doppler shift effect is given as $$E_{i,p}(t) = A_{i,p,0} \exp\left[ j \left( \phi_{i,p,0} + \frac{2\pi}{\lambda} vt\cos\alpha_{i,p,0} \right) \right] + \sum_{k=1}^{M} A_{i,p,k} \exp\left[ j \left( \phi_{i,p,k} + \frac{2\pi}{\lambda} vt\cos\alpha_{i,p,k} \right) \right] \quad (3)$$

where v is the mobile speed and $\lambda$ is the wavelength of the radio carrier frequency. M is the number of diffusion rays (e.g., M=10-100). $A_{i,p,0}$ is the amplitude of the ray-tracing generated ray, such as LOS transmission ray, spectral reflection ray, main diffraction ray, and main scattering ray to the receiver. $A_{i,p,k}$ is the amplitude of each diffusion ray around the ray-tracing generated ray. $\phi_{i,p,0}$ is the initial phase of the ray-tracing generated ray component and $\phi_{i,p,k}$ is the initial phase of the diffusion ray. $\alpha_{i,p,0}$ is the incident angle from the ray-tracing generated ray with respect to the mobile route in radians and $\alpha_{i,p,k}$ is the incident angle of the diffusion ray in radians.

The first term of Equation 3 represents the amplitude of each ray calculated from the ray-tracing simulation. Since ray-tracing calculations account for LOS and NLOS path loss, long-term fading, angle of arrival, and initial phase for each determinate ray, we consider these to be the deterministic parameter set. However, since the diffusion rays are not calculated by ray-tracing simulation due to the computation complexity and the diffusive propagation uncertainty, a CoDiT statistical channel model concept is used that enables modeling of short-term fading characteristics caused by spatial scatterers or the diffusion waves before the signals reach the receiver. These diffused waves shown in FIG. 2 are modeled by the second term of Equation 3. Assume the total received signal amplitude from each ray-tracing ray and its associated diffusion rays is a random variable which is defined as:

$$r_{i,p} = A_{i,p,k} \quad k=0, 1, \ldots, M \quad (4)$$

The Nakagami m-distribution is used to describe the signal envelope, which is given by $$f_{R_{i,p}}(r_{i,p}) = \frac{2}{\Gamma(m_{i,p})} \left( \frac{m_{i,p}}{\Omega_{i,p}} \right)^m (r_{i,p})^{2m-1} \exp\left( -\frac{m_{i,p}}{\Omega_{i,p}} r_{i,p}^2 \right) \quad (5)$$

where $R_{i,p}$ is a set of random variables $$\Omega_{i,p} = E\{R_{i,p}\} \quad (6)$$

$$m_{i,p} = \frac{\Omega_{i,p}^2}{E\{[R_{i,p}^2 - \Omega]^2\}} \quad (7)$$

$$m_{i,p} \geq \frac{1}{2}$$

The Nakagami m-distribution is, in general, fairly representative of the distribution of any ray-tracing generated ray and its associated diffused rays. As $m_{i,p}$ increases, the fading will be less severe and more Rician distributed. As a special case, Nakagami m-distribution becomes Rayleigh with $m_{i,p}=1$ and is a close approximation to the Ricean distribution for $m_{i,p} \gg 1$.

Since the Nakagami m-distribution is dependent on the values of $m_{i,p}$ and $\Omega_{i,p}$, it is important to note that the mean energy value of $\Omega_{i,p}$ can be obtained from the results obtained from the ray-tracing simulation. However, the value of $m_{i,p}$ based on the CoDiT model is used, since the ray-tracing simulator does not model it. In general, the value of $m_{i,p}$ is related to the wall surface roughness and building structure irregularity. For example, one can choose $m_{i,p}=15$ for the short-term propagation conditions or use this value as the mean value of a (truncated) Gaussian random variable to randomly select a $m_{i,p}$. If LOS situation is obtained between BS and MS, one can choose $m_{i,p}=30$. Thus, the values of $A_{i,p,k}$ (where k=0, 1, ..., M) can be calculated with the following three constraints.

$$E\{A_{i,p,k}\} = 0 \quad (8)$$

$$E\{A_{i,p,k}^2\} = \frac{\Omega_{i,p}}{M} \left( 1 - \sqrt{1 - m_{i,p}^{-1}} \right) \quad (9)$$

$$A_{i,p,0} = \sqrt{\Omega_{i,p} \sqrt{1 - m_{i,p}^{-1}}} \quad (10)$$

The second term in Equation 3 can be solved by selecting $\phi_{i,p,k}$ from the uniform distribution over $[\pi, -\pi]$, so that the superposition of these partial waves corresponds to diffusion interferences. The incident angles $\alpha_{i,p,k}$ are taken from a truncated Gaussian distribution with mean value $\alpha_{i,p,0}$ and standard deviation s=0.15 rad (=8.59°). The incident angle of $\alpha_{i,p,0}$, the initial phase of $\phi_{i,p,0}$, and the amplitude of $A_{i,p,0}$ in the first term of Equation 3, are exactly determined from the ray-tracing simulation.

The simulated result of $E_{i,p}(t)$ within one time bin (e.g., a chip duration is around 0.8 us for AFLT) will be vector-summed (i.e., complex-component summed) together to produce the complex amplitude of $E_i(t)$ which will be pre-processed by ray-tracing simulator and saved the ray-tracing simulation result as a single entry in a look-up table.

Figure 6:
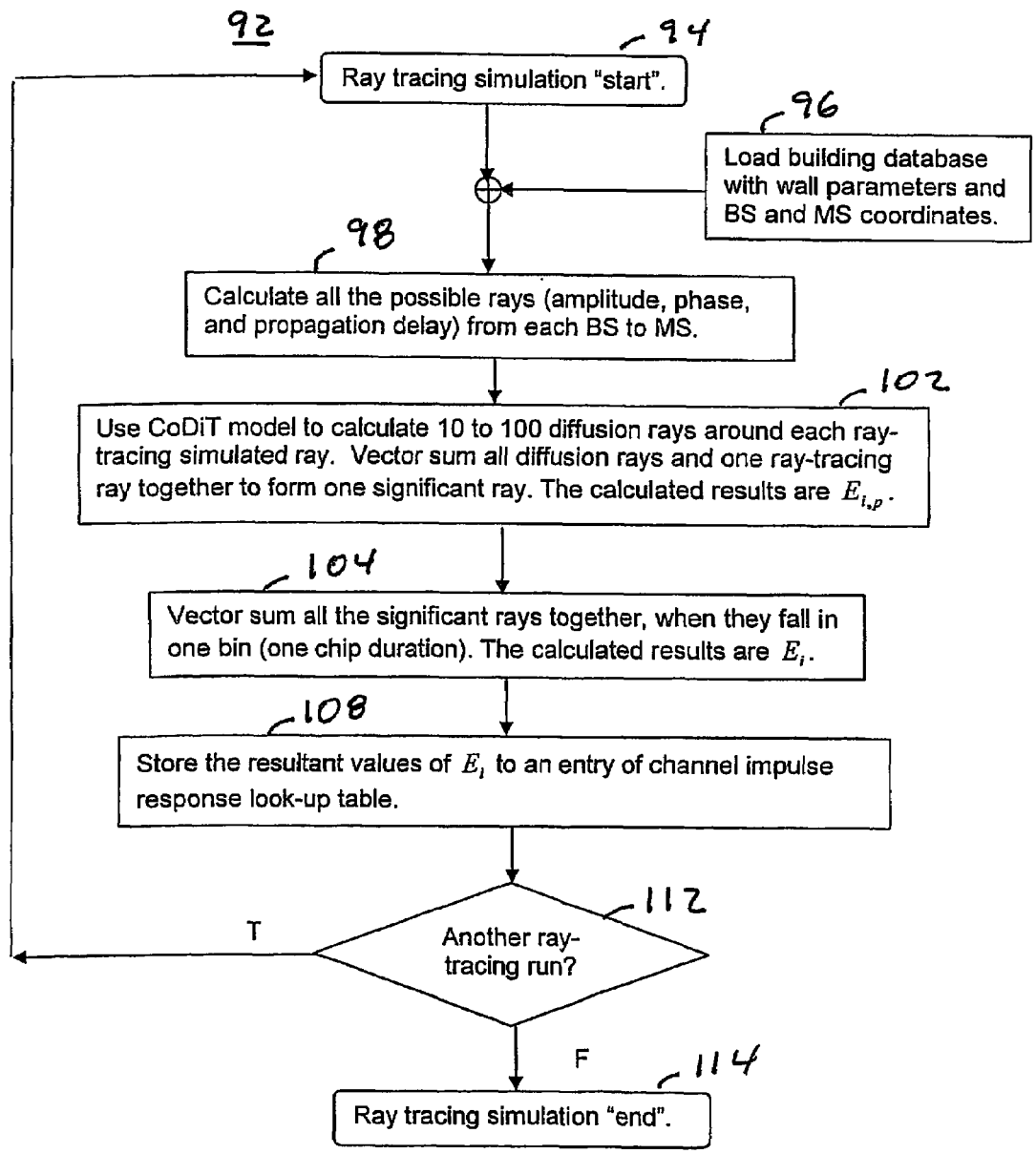
FIG. 6 illustrates a method flow diagram representative of operation of an embodiment of the present invention.

FIG. 6 illustrates a flow diagram, shown generally at 92, that generates the pre-processed channel impulse response of $E_{i(t)}$. Operations start at the block 94 at the ray tracing simulation start. A building database is loaded with wall parameters and base station and mobile station coordinates, as indicated at the block 96. Then, and as indicated by the block 98, all of the possible rays from each base station to the mobile station are calculated. The rays are represented in terms of amplitude, phase, and propagation delay.

Then, and as indicated by the block 102, CoDiT modeling is used to calculate ten to one hundred diffusion rays around each ray tracings simulated ray calculated at the operation 98. And, all of the diffusion rays are vector summed together, and one ray-tracing ray together forms one significant ray. The calculated results are $E_{ip}$.

Then, at the block 104, all of the significant rays are vector summed together when within a single chip duration (shown in FIG. 5). The calculated results define $E_i$. Thereafter, and as indicated by the block 108, the resultant values are stored to an entry of a channel impulse channel look-up table.

Thereafter, a decision is made, indicated by the decision block 112, as to whether to perform another ray-tracing run. If so, the T branch is taken back to the block 94. Othewise, a branch is taken to the N block 114.

Then, this look-up table will be stored in the computer DRAM for real-time emulation of the propagation channel. Each entry of this looked-up table represents one propagation channel for a specified MS (mobile station) and BS (base station) coordinate pair, and for the particular building locations and structures modeled from the environment. When we run this geo-location propagation channel emulator as in FIG. 1, this pre-processed entry of looked-up table will feed into a tapped-delay-line model in real-time, which is shown in FIG. 4.

Channel models formed in manners as described above are utilized in a state-of-the-art hardware-in-the-loop test system that is used to test E911 Phase II compliance of AFLT-capable mobile devices in CDMA networks. The novelty of this approach is in the inclusion of an area-specific channel emulation module that provides more realistic channel predictions. The channel predictions are semi-deterministic. The deterministic component of the channel is the outcome of a ray tracing procedure that operates on 3D building and electromagnetic parameter database in order to predict the specular and diffuse multipath arrivals for each transmitter/receiver location pair in the area under study. The actual network geometry, including base station locations, is used in order to provide a more realistic estimate of the radio channel. Ray tracing is best suited to predict how the long-term properties of the channel change as the receiver position varies over a significant fraction of the transmitter-receiver distance. However, ray-tracing may not fully capture the effects that local scatterers or movement in the local area of the mobile have on the received signal, since that type of prediction would require more detailed modeling than would be feasible in most cases. In order to model the short-term effects of the channel (such as Rayleigh fading), the measurement-based statistical model, CoDiT, is used which provides an easy way to model the effects of scattering on the (short term) fading characteristics of the signal. The CoDiT model uses the Nakagami-m distribution in order to model the short term fading. The 'm' parameter controls the level of fading experienced at the receiver. Nakagami-1 produces Rayleigh fading and Nakagami-m (m>>1) produces Ricean-like fading.

The advantages of using ray tracing as the main vehicle for channel prediction is in the inherent spatial correlation of the observed output. The spatial aspect of the radio channel characterizes the similarity of signal received in two locations that are separated by some distance, d. This is formally observed in the similarity between the times of arrival, angles of arrival and powers of the individual paths that constitute the multipath impulse response as a function of the receiver location. The spatial correlation relation is never captured in the channel models that fail to model the geometry of the area. Ray tracing, however, can use the area-specific building database information in order to give some indication of the spatial aspects of the radio channel.

By introducing the stochastic short term fading into the channel model after ray tracing, a purely deterministic ray tracing prediction is elevated to an even more realistic representation of what field-test engineers encounter in the real world. Addition of the short-term fading gives even more insight into the temporal characteristics of the radio signal. This is true because if the receiver remains in one location, the ray-tracing tool will predict that the channel will not change. However, experience reveals that if there is motion around the mobile device (even when it is stationary), that there should always be some degree of fluctuation in the radio channel as a function of time. The short term fading is also generated by the presence of the local scatterers. Since it is not feasible to assume that one can fully model all of the scatterers and their motion in the local area of the mobile, one can use these stochastic short term fading models in order to model the effect of scattering on the radio signal.

Since full 3D ray tracing tends to be a slow process, the optimal approach is to pre-compute the channel models and then to store them as look-up tables in computer RAM for their real-time generation within the test system.

In the exposition to follow, a commercial E911 Phase II compliance test system includes, in addition to the usual network emulation modules, an area-specific channel impulse response module that provides a semi-deterministic radio channel prediction to the test system in real time. The key feature of this approach is in the inherent ability to design an unlimited number of realistic test cases, every one of which can either be specifically tailored to studying the AFLT system performance of the particular market-under-study or that can be used to study performance for a set of standardized test cases.

Figure 7:
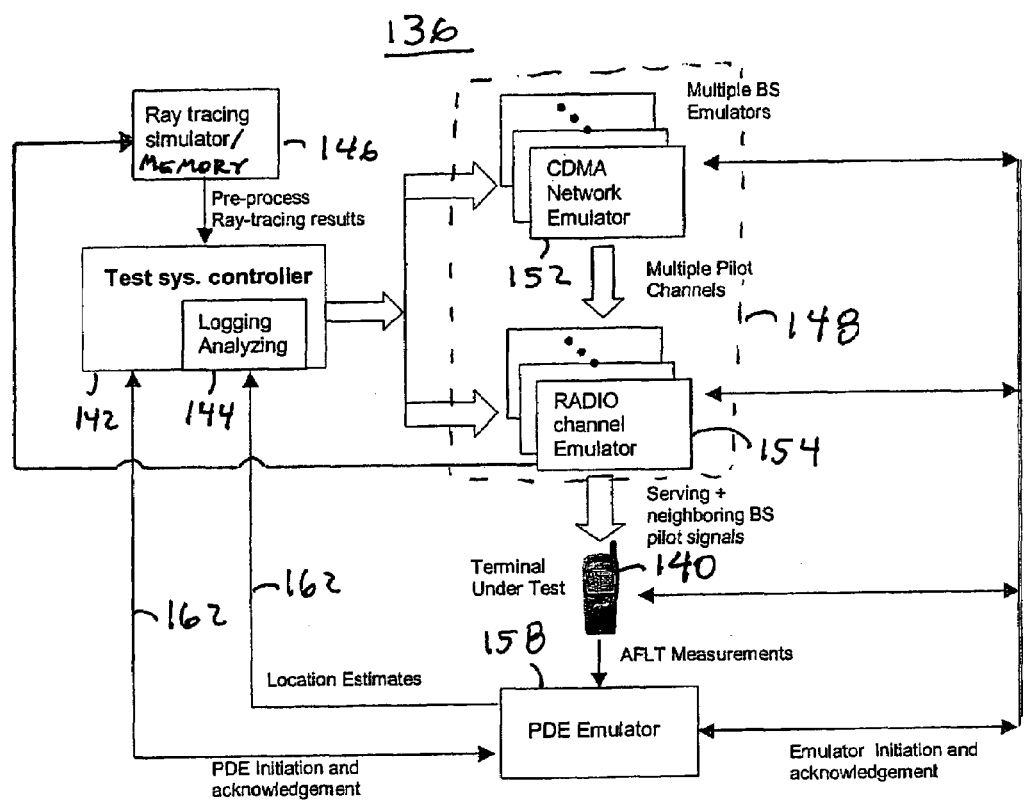
FIG. 7 illustrates a functional block diagram of the testing apparatus of an embodiment of the present invention at which a terminal under test is positioned to determine its E911 Phase II compliance.

Turning next to FIG. 7, testing apparatus, shown generally at 136, operates to test operation of a mobile terminal, here mobile terminal 140. The elements of the testing apparatus are functionally represented, implementable in any desired manner, such as by algorithms executable by processing circuitry. In one exemplary implementation, the elements of the testing apparatus are formed, in significant part, at a computer workstation, or the like, together with appropriate interface elements to interface with the mobile terminal. And, in the exemplary implementation, the testing apparatus is used to test compliance of the mobile terminal pursuant to E911 Phase II requirements. While the following description shall describe operation of the testing apparatus with respect to its exemplary implementation to test operation of the terminal under test for its E911 Phase II compliance, the testing apparatus is analogously operable to test other operation of a mobile terminal.

The apparatus 136 includes a test system controller 142 that operates, generally, to control operation of the testing apparatus. The controller includes an analyzer 144 that operates to detect and to log responses generated by the terminal under test 140 during testing thereof. A ray tracing simulator and memory element 146 is operable, in manners described above, to perform ray tracing, and other, operations to form channel estimates, and to store in the memory elements values representative of the results of the calculations.

The testing apparatus further includes an operating environment emulator 148, here formed of a CDMA network emulator 152 and a radio channel emulator 154. The network emulator emulates a plurality of base stations, such plurality of base stations being represented in the figure by the multiple blocks of the network emulator. And, emulated pilot signals are formed by the network emulator elements. The radio channel emulator 154 emulates radio channels upon which the emulated pilot signals are broadcast to a mobile terminal in an actual operating environment. The radio channel emulator makes use of the ray tracing simulator calculations, values of calculations made thereat are stored at the storage element 146.

And, the testing apparatus also includes a position determination entity (PDE) emulator 158. The emulator 158 is positioned, when the terminal under test 140 is positioned for testing to receive responses, here AFLT measurements, generated by the terminal. The position determination entity emulator is coupled to the controller 142, here by way of the lines 162. Location estimates and control signaling, e.g., initiation and acknowledgment signaling, are generated on the lines 162.

The Test System Controller 142 is a standard personal computer, which can be interconnected to any standard local area network, LAN. In addition, normal PC accessories may be used with the Test System Controller. The Test System Controller selects the test scenarios and controls the equipment that is integrated into the test environment. This device also monitors the feedback from the other devices and receives the test performance results. The Test System Controller also provides the user interface for the verification system for the operator. All of the measurements, analysis, maintenance and calibration operations are controlled and automatically carried out by this element. The Test System Controller also computes the location error statistics, as per Equation (1), set forth previously.

The test system software describes any and all software that is used within the test system to execute the test scenarios, log events, or otherwise perform the actions that are necessary to drive the laboratory test system.

The CDMA network emulator 148 consists of a number of emulated radio channels capable of producing 3GPP compliant forward link signals, including the pilot channel. The signals are generated in the cellular (850 MHz) and PCS (1900 MHz) bands. The test system need only generate the CDMA channels for those base station transmitters that are visible to the mobile at its virtual network location. Provision must be made for the CDMA network emulator to receive the signals that are sent on the uplink from the terminal-under-test to the PDE (Position Determination Entity).

The radio channel emulator 154 imposes radio path conditions (i.e., multipath and fading) to the signal that is generated by CDMA base station simulator in the downlink direction. The radio channel is generated, in real time, in the laboratory environment, by the use of multipath channel look-up tables that are stored in RAM. The channel information is pre-computed as the output of a semi-deterministic ray tracing tool and the results are stored in a look-up table that correlates the relevant aspects of the radio channel as a function of position within the network.

The ray-tracing tool 146 operates on: 3D building database information (with the accompanying electromagnetic parameter database information, such as permittivity and other parameters that affect radio wave interaction with the environment); Land use/land cover information; Terrain and digital elevation models; and other user-supplied area-specific input in order to produce a realistic characterization of the radio channel.

The ray-tracing simulator should include the following calculations: Ground reflection, back-wall reflection, reflection surface roughness; Fresel zone diffraction, the Uniform Theory of Diffraction (UTD), and rooftop diffraction; and Vector summation (not scalar summation) of the multipath rays that arrive at the receiver.

Since ray-tracing does not generally calculate the diffused rays, a new methodology for channel prediction is proposed whereby we use ray tracing in order to predict the specular components of the multipath impulse response, a stochastic model based on CoDiT (Code Division Testbed) is used in order to create the random phases and angles of arrival of the diffused rays. These diffused rays will contribute to the short-term fading and the Doppler shift in the channel model. This approach will serve to elevate the ray-traced channel model to an even more realistic representation of the energy propagation in each specific area.

Once the long-term and short-term characteristics of the channel have been predicted for a specific geographical area, one may use this information in order to pre-compute a set of look-up tables 146 that will be loaded into the test system controller.

In order to assign a multipath mask for each transmitter location, first discretize the time delay axis into a set of bins (with the first bin corresponding to LOS arrivals). By observing if there are rays that occupy the first bin, one can determine the multipath mask category for each receiver location, i.e., whether a particular receiver location should be classified as LOS only, LOS+ echoes, echoes only or obstructed. (In the latter case, the base station is not visible).

FIG. 8 illustrates a representation of the multi-path mask, shown generally at 164. The multi-path mask here identifies four regions, a first region 166, a second region 168, a third region 172, and a fourth region 174. The inner-most region 166 is representative of a line-of-sight (LOS) region. The region 168 is representative of a region that includes line-of-sight echoes; the region 172 is representative of the region formed of echo-only areas; and the region 174 is representative of obstructed regions. This classification system drives the generation of channel look-up tables.

A sample multipath mask look-up table 182 is shown in FIG. 9. For each BS-Rx pair 184-186, the multipath category 188 is assigned. For each receiver location, the test system also requires a vector of channel parameters, as illustrated in FIG. 9. The parameter set $A_{ij}$, $B_{ij}$, $C_{ij}$, $D_{ij}$ are channel parameter vectors that are associated with the i-j$^{th}$ BS-receiver pair. The number of occupied delay bins in the power delay profile determines the length of the parameter vector set for each BS-receiver location (see FIG. 5). The required channel parameters are, respectively, given by the time delays, the Nakagami-m fading parameter (derived using the CoDiT model), the angles of arrival and the power associated with each multipath bin. These tables are pre-computed and uploaded to the test system for real time generation of the channel impulse response during the testing phase.

The terminal unit under test 140, shown in FIG. 7, is a CDMA cellular or PCS mobile phone that is a representative sample of the manufacturer's production. From the CDMA Network Emulator, the terminal under test shall receive positioning commands and respond with results in a standard-compliant format. The terminal under test shall utilize the measured CDMA pilot signals during the positioning process. In addition, the terminal under test shall be responsive to configuration commands from the Test System Controller, such as via an external serial or accessory connector.

The PDE emulator 158, also shown in FIG. 7, is a module that provides network assistance data to the terminal under test in a standard compliant manner. It also uses the pilot signal measurements sent by the terminal under test (via IS-801) and the base station's coordinates in order to calculate the position. The PDE block is required to be a representative sample of the PDE vendor's production.

The system maintains a log of the operational status of each component and any problems that may arise during the examination of different test scenarios. The logging device sends a report to the test system controller at the termination of each test scenario.

Figure 10:
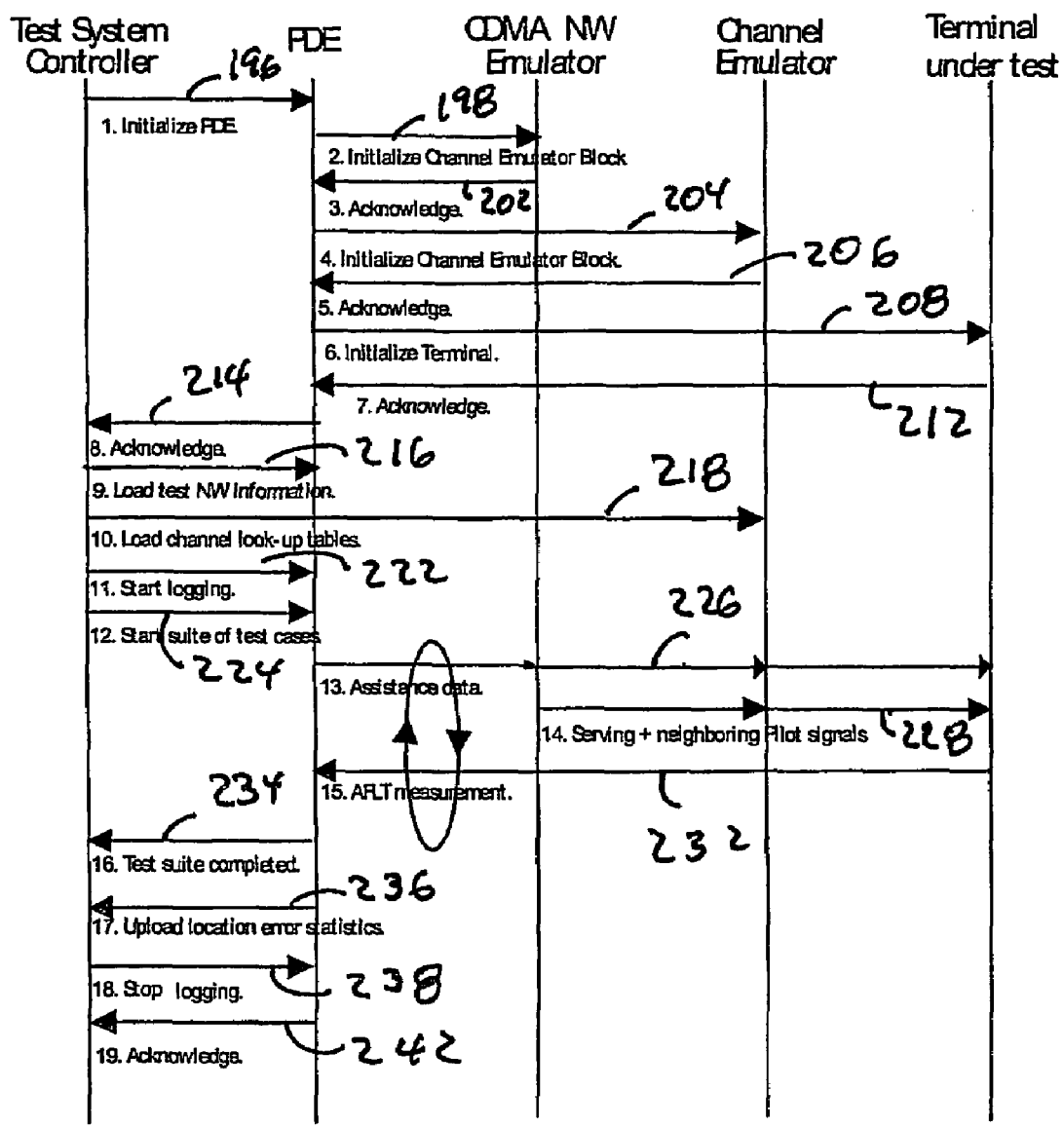
FIG. 10 illustrates a message sequence diagram representative of signaling generated during operation of an embodiment of the present invention.

FIG. 10 illustrates a message sequence diagram, shown generally at 194, representative of signaling generated during operation of an embodiment of the present invention. The signaling is representative of signaling formed between the various entities of the testing apparatus, shown in FIG. 7.

Once the test case has been defined, the pre-processed channel impulse response look-up tables are loaded into the test environment. Communication between the test system elements begins with the initialization and acknowledgement procedure indicated by the segments 196, 198, 202, 204, 206, 208, 212, and 214. Once all of the elements 148, 154, and 140 have transmitted positive acknowledgements to the test system controller, the testing procedure begins. Testing information is provided to the PDE and the channel emulator, indicated by the segments 216 and 218. The logging device keeps an active record of the events that occur during the duration of the test. The location procedure is activated when the PDE sends assistance data to the terminal under test by way of the emulated network, indicated by segments 222 and 224. Upon reception, the terminal under test begins to capture the pilot signals from its serving and a specified number of neighbor sites. This information is transmitted back to the PDE through the emulated network, indicated by the segment 232, where the location calculation is done. If another test is to be done, then the process steps 218-232 are repeated. Once the full suite of test cases has been completed, the PDE sends the location error statistics to the test system controller at step 234. Finally, the test system controller commands the logging device to stop its logging procedure, indicated by the segment 236. The final outcome of the test system is a prediction of horizontal positioning accuracy for the specific test case studied.

The previous descriptions are of preferred examples for implementing the invention, and the scope of the invention should not necessarily be limited by this description. The scope of the present invention is defined by the following claims.

What is claimed:

1. A testing apparatus for testing a terminal under test pursuant to a control environment emulative of an operating environment, said apparatus comprising:
    an operating environment emulator for generating emulated signals for application to the terminal under test, the emulated signals emulative of signals generated and communicated in the operating environment, emulation of the operating environment utilizing a modeled radio channel, modeled using a channel impulse response estimate formed of a combination of at least a first non-diffuse component and at least a diffuse component; and
    a detector adapted to receive indications of responses made by the terminal under test in response to the application to the terminal under test of the emulated signals generated by said operating environment emulator.

2. The apparatus of claim 1 wherein the terminal under test selectably operates to calculate a positioning indication, wherein responses made by the terminal, and of which said detector is coupled to receive, comprise calculations made by the terminal under test of the positioning indication.

3. The apparatus of claim 2 wherein the emulated signals generated by said operating environment emulator comprise position-determining signals that permit the terminal under test to calculate the positioning indication.

4. The apparatus of claim 1 further comprising a storage element for storing values representative of the channel impulse response, the values stored at said storage element accessible by said operating environment emulator pursuant to generation of the emulated signals.

5. The apparatus of claim 1 wherein said operating environment emulator comprises a network emulator, said network emulator for emulating aspects of an operating network with which the terminal under test is operable to communicate.

6. The apparatus of claim 5 wherein the operating network that said network emulator emulates comprises a plurality of base stations, each of which generates a pilot signal, and wherein said network emulator emulates the pilot signals generated by the plurality of base stations.

7. The apparatus of claim 6 wherein the plurality of base stations, and pilot signals generated thereat, emulated by said network emulator comprise base stations operable in a code-division, multiple-access cellular communication system.

8. The apparatus of claim 6 wherein said operating environment emulator further comprises a radio channel emulator for emulating a radio channel upon which signals are communicated to the terminal under test when operated in the operating environment, the radio channel emulated by said radio channel emulator forming the modeled radio channel, and the pilot signals formed by said network emulator are applied to said radio channel emulator.

9. The apparatus of claim 1 wherein said operating environment emulator comprises a radio channel emulator for emulating a radio channel upon which signals are communicated to the terminal under test when operated in the operating environment, the radio channel emulated by said radio channel emulator forming the modeled radio channel.

10. The apparatus of claim 1 further comprising a position determination entity emulator adapted to receive the responses made by the terminal under test, said position determination entity for generating the indications of the responses.

11. The apparatus of claim 10 wherein the terminal under test operates to perform advanced forward link trilateration measurements and wherein the responses made by the terminal under test comprises values of the advanced forward link trilateration measurements.

12. The apparatus of claim 1 wherein said detector logs the indications of the responses.

13. The apparatus of claim 1 further comprising a test controller, said test controller for controlling operation of said operating environment emulator and said detector.

14. The apparatus of claim 13 wherein said test controller causes said operating environment emulator to generate emulated signals emulative of a first operating environment and of a second operating environment.

15. A method for testing a terminal under test pursuant to a control environment emulative of an operating environment, said method comprising the operations of:
    generating emulated signals for application to the terminal under test, the emulated signals emulative of signals generated and communicated in the operating environment, emulation of the operating environment utilizing a modeled radio channel, modeled using a channel impulse response estimate formed of a combination of at least a first non-diffuse component and at least a first diffuse component;
    applying the emulated signals generated during said operation of emulating to the terminal under test; and
    detecting indications of responses made by the terminal under test in response to application, during said operation of applying, of the emulated signals to the terminal under test.

16. The method of claim 15 further comprising the operation, responsive to the application of the emulated signals during said operation of applying to the terminal under test, of calculating, at the terminal under test, a positioning indication, the indications detected during said operation of detecting indicative of the positioning indication.

17. The method of claim 16 wherein said operation of calculating comprises calculating advanced forward link trilateration measurements responsive to the emulated signals applied during said operation of applying.

18. The method of claim 15 further comprising the operation, prior to said operation of generating, of storing values representative of the channel impulse response, the values stored during said operation of storing, accessible pursuant to said operation of generating.

19. The method of claim 15 wherein said operation of generating the emulated signals comprises emulating aspects of an operating network with which the terminal under test is operable.

20. An emulating system for determining positional coordinates of a mobile device comprising:
    a network emulator for generating multiple test signals each test signal associated with a communication channel of a base transceiver station having geographic coordinates within specific geographic area;
    a channel emulator for processing each test signal using simulation data, and generating a channel response signal for each test signal indicating the effects of the simulation data, wherein the simulation data comprises interference parameters that represent reflective, diffractive, path loss, diffusive, and Doppler effect properties created by selectable obstructions over a selectable distance d between the mobile device and the base transceiver station and the vector summation of these properties; and
    a position detection emulator for calculating positional coordinates based on each channel response signal generated and the geographic coordinates of each base transceiver station.

* * * * *